(12) United States Patent
Tsujimoto et al.

(10) Patent No.: US 10,875,106 B2
(45) Date of Patent: Dec. 29, 2020

(54) CUTTING INSERT

(71) Applicant: SUMITOMO ELECTRIC HARDMETAL CORP., Itami (JP)

(72) Inventors: Shota Tsujimoto, Itami (JP); Yusuke Koike, Itami (JP); Yasuyuki Kanada, Itami (JP); Atsuhiko Maeta, Itami (JP); Tomoyuki Fukuyama, Itami (JP); Yoshinari Nagami, Itami (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 132 days.

(21) Appl. No.: 16/309,520

(22) PCT Filed: Jan. 16, 2018

(86) PCT No.: PCT/JP2018/001048
§ 371 (c)(1),
(2) Date: Dec. 13, 2018

(87) PCT Pub. No.: WO2018/198445
PCT Pub. Date: Nov. 1, 2018

(65) Prior Publication Data
US 2019/0176250 A1 Jun. 13, 2019

(30) Foreign Application Priority Data
Apr. 25, 2017 (JP) ................. 2017-086479

(51) Int. Cl.
*B23C 5/20* (2006.01)
*B23C 5/22* (2006.01)
*B23C 5/06* (2006.01)

(52) U.S. Cl.
CPC ............. *B23C 5/2221* (2013.01); *B23C 5/06* (2013.01); *B23C 5/207* (2013.01); *B23C 5/20* (2013.01);
(Continued)

(58) Field of Classification Search
CPC ...... B23C 2200/0416; B23C 2200/126; B23C 2200/201; B23C 2200/208; B23C 5/06;
(Continued)

(56) References Cited

U.S. PATENT DOCUMENTS 4,645,384 A * 2/1987 Shimomura .......... B23C 5/2243
407/42
4,755,086 A * 7/1988 Stashko ................ B23B 27/145
407/114
(Continued)

FOREIGN PATENT DOCUMENTS

JP 2011-020192 A 2/2011
WO 2004/058438 A1 7/2004
(Continued)

*Primary Examiner* — Nicole N Ramos
(74) *Attorney, Agent, or Firm* — Baker Botts L.L.P.;
Michael A. Sartori (57) ABSTRACT

The cutting edge has: a corner cutting edge; a flat cutting edge continuous to a first end portion of the corner cutting edge; and a main cutting edge continuous to a second end portion of the corner cutting edge opposite to the first end portion of the corner cutting edge. The rake face has: a first rising surface portion; and a first rake face portion continuous to the first rising surface portion and located opposite to the corner cutting edge when viewed from the first rising surface portion. When viewed in a direction perpendicular to the reference surface, the first boundary includes a first line segment extending, from one of the flat cutting edge and the corner cutting edge, in a direction crossing a straight line extending along the main cutting edge.

9 Claims, 11 Drawing Sheets

(52) U.S. Cl.
CPC .... *B23C 2200/08* (2013.01); *B23C 2200/126* (2013.01); *B23C 2200/208* (2013.01)

(58) Field of Classification Search
CPC ........... B23C 5/10; B23C 5/202; B23C 5/207; B23C 5/2221
See application file for complete search history.

(56) References Cited

U.S. PATENT DOCUMENTS

| | | | | |
|---|---|---|---|---|
| 5,544,984 | A * | 8/1996 | Pantzar | B23C 5/207 407/113 |
| 5,810,521 | A * | 9/1998 | Pantzar | B23B 27/145 407/114 |
| 7,402,004 | B2 * | 7/2008 | Tanaka | B23C 5/10 407/53 |
| 8,777,524 | B2 * | 7/2014 | Choi | B23C 5/109 407/42 |
| 10,213,851 | B2 * | 2/2019 | Koike | B23C 5/2243 |
| 2006/0060053 | A1 | 3/2006 | Tanaka et al. | |
| 2007/0003384 | A1 * | 1/2007 | Smilovici | B23C 5/2221 407/113 |
| 2007/0071559 | A1 * | 3/2007 | Koskinen | B23B 27/16 407/34 |
| 2008/0304924 | A1 * | 12/2008 | Engstrom | B23C 5/202 407/114 |
| 2011/0008112 | A1 * | 1/2011 | Abe | B23C 5/109 407/42 |
| 2012/0070240 | A1 * | 3/2012 | Ishi | B23C 5/06 407/42 |
| 2012/0070242 | A1 * | 3/2012 | Choi | B23C 5/109 407/113 |
| 2012/0128440 | A1 * | 5/2012 | Ishi | B23C 5/06 409/132 |
| 2013/0108388 | A1 * | 5/2013 | Ishi | B23C 5/207 409/132 |
| 2013/0251464 | A1 * | 9/2013 | Hecht | B23C 5/2221 407/48 |
| 2014/0010605 | A1 * | 1/2014 | Smilovici | B23C 5/207 407/42 |
| 2014/0041495 | A1 * | 2/2014 | Koga | B23C 5/207 83/13 |
| 2016/0082528 | A1 * | 3/2016 | Ballas | B23C 5/06 407/48 |
| 2016/0375506 | A1 | 12/2016 | Koike et al. | |
| 2019/0283148 | A1 * | 9/2019 | Koike | B23C 5/2221 |

FOREIGN PATENT DOCUMENTS

| | | | | |
|---|---|---|---|---|
| WO | WO-2011052340 | A1 * | 5/2011 | ............ B23C 5/202 |
| WO | WO-2013065347 | A1 * | 5/2013 | ............ B23C 5/202 |
| WO | 2015/020115 | A1 | 2/2015 | |
| WO | 2015/174200 | A1 | 11/2015 | |

\* cited by examiner

CUTTING INSERT

TECHNICAL FIELD

The present invention relates to a cutting insert. The present application claims a priority based on Japanese Patent Application No. 2017-086479 filed on Apr. 25, 2017, the entire content of which is incorporated herein by reference.

BACKGROUND ART

WO2015/174200 (Patent Literature 1) discloses a cutting insert for milling. The inclination angle of a rake face continuous to a main cutting edge of the cutting insert is substantially unchanged in the extending direction of the main cutting edge.

CITATION LIST

Patent Literature

PTL 1: WO2015/174200

SUMMARY OF INVENTION

A cutting insert according to one embodiment of the present invention includes a first surface, a second surface, and a side surface. The second surface is located opposite to the first surface. The side surface is continuous to both of the first surface and the second surface. A ridgeline between the first surface and the side surface includes a cutting edge. The first surface includes a rake face and a reference surface, the rake face being continuous to the cutting edge, the reference surface being located opposite to the cutting edge relative to the rake face, the reference surface having a flat shape. The cutting edge has a corner cutting edge, a flat cutting edge, and a main cutting edge, the flat cutting edge being continuous to a first end portion of the corner cutting edge, the main cutting edge being continuous to a second end portion of the corner cutting edge opposite to the first end portion of the corner cutting edge. The rake face has a first rising surface portion and a first rake face portion, the first rake face portion being continuous to the first rising surface portion, the first rake face portion being located opposite to the corner cutting edge when viewed from the first rising surface portion. In a cross section parallel to the flat cutting edge and perpendicular to the reference surface, a first boundary between the first rising surface portion and the first rake face portion is an inflection point. When viewed in a direction perpendicular to the reference surface, the first boundary includes a first line segment extending, from one of the flat cutting edge and the corner cutting edge, in a direction crossing a straight line extending along the main cutting edge.

DETAILED DESCRIPTION

Problem to be Solved by the Present Disclosure

When a workpiece is processed using the cutting insert disclosed in WO2015/174200, a scratch mark may remain in the processed surface of the workpiece.

An object of one embodiment of the present invention is to provide a cutting insert by which a scratch mark can be suppressed from remaining in a processed surface of a workpiece.

Advantageous Effect of the Present Disclosure

According to one embodiment of the present invention, there can be provided a cutting insert by which a scratch mark can be suppressed from remaining in a processed surface of a workpiece.

DESCRIPTION OF EMBODIMENTS

First, the following describes a summary of an embodiment of the present invention.

(1) A cutting insert 100 according to one embodiment of the present invention includes a first surface 5, a second surface 7, and a side surface 6. Second surface 7 is located opposite to first surface 5. Side surface 6 is continuous to both of first surface 5 and second surface 7. A ridgeline between first surface 5 and side surface 6 includes a cutting edge 3. First surface 5 includes a rake face 9 and a reference surface 1, rake face 9 being continuous to cutting edge 3, reference surface 1 being located opposite to cutting edge 3 relative to rake face 9, reference surface 1 having a flat shape. Cutting edge 3 has a corner cutting edge 33, a flat cutting edge (wiper) 13, and a main cutting edge 23, flat cutting edge 13 being continuous to a first end portion C1 of corner cutting edge 33, main cutting edge 23 being continuous to a second end portion C2 of corner cutting edge 33 opposite to first end portion C1 of corner cutting edge 33. Rake face 9 has a first rising surface portion 32 and a first rake face portion 11, first rake face portion 11 being continuous to first rising surface portion 32, first rake face portion 11 being located opposite to corner cutting edge 33 when viewed from first rising surface portion 32. In a cross section parallel to flat cutting edge 13 and perpendicular to reference surface 1, a first boundary J1 between first rising surface portion 32 and first rake face portion 11 is an inflection point. When viewed in a direction perpendicular to reference surface 1, first boundary J1 includes a first line segment L1 extending, from one of flat cutting edge 13 and corner cutting edge 33, in a direction crossing a straight line E3 extending along main cutting edge 23.

Figure 12:
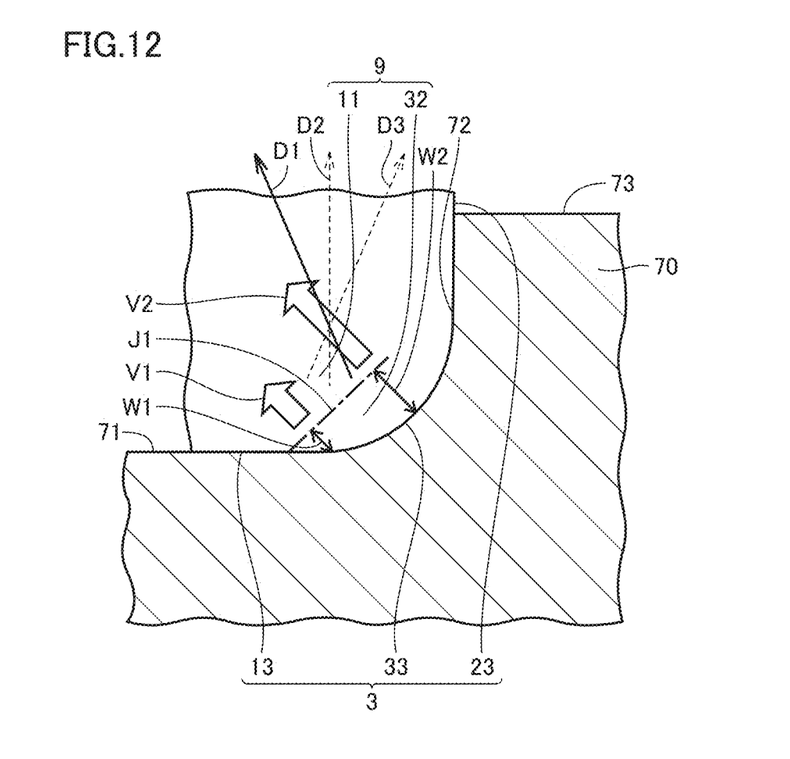
FIG. 12 is a schematic front view showing a state in which a workpiece is cut using a cutting tool.
Figure 13:
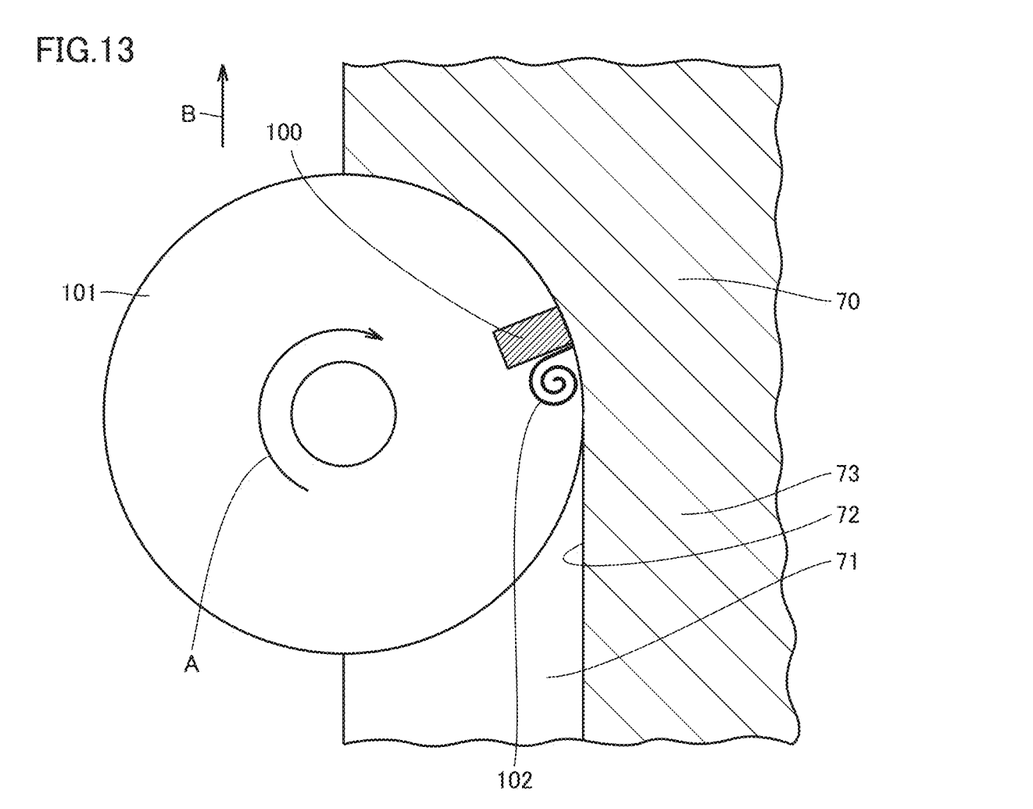
FIG. 13 is a schematic plan view showing a state in which the workpiece is cut using the cutting tool.

With reference to FIG. 12 and FIG. 13, the following describes a state in which a corner cutting process is performed to a workpiece 70 using cutting insert 100. Cutting edge 3 of cutting insert 100 has flat cutting edge 13, main cutting edge 23, and corner cutting edge 33. As shown in FIG. 13, cutting insert 100 is attached to a milling cutter body 101. By rotation of milling cutter body 101, cutting insert 100 is rotated in a rotation direction A. Milling cutter body 101 is moved in a movement direction B while rotating in rotation direction A. Cutting edge 3 thus rotating cuts workpiece 70, thereby generating swarf 102. Preferably, swarf 102 is curled whirlingly.

In the cutting insert disclosed in WO2015/174200, the inclination angle of the rake face continuous to the main cutting edge of the cutting insert is substantially unchanged in the extending direction of the main cutting edge. Accordingly, when workpiece 70 is processed using such a cutting insert, the outlet velocity of the swarf portion in the vicinity of the center of main cutting edge 23 is similar to or lower than the outlet velocity of the swarf portion in the vicinity of corner cutting edge 33. In this case, the outlet direction of the whole of swarf 102 becomes a direction D2 substantially parallel to side surface 72 of workpiece 70 or a direction D3 including a vector component of an outer circumferential direction of the milling cutter body. In these cases, when the diameter of the curl of swarf 102 becomes large, swarf 102 is brought into contact with processed side surface 72 of workpiece 70, with the result that a scratch mark remains in side surface 72. Side surface 72 loses metallic luster and looks white, for example. Moreover, swarf 102 may pass over side surface 72 and come into contact with unprocessed upper surface 73 of workpiece 70, with the result that a scratch mark may remain in upper surface 73. In this case, upper surface 73 loses metallic luster and looks white, for example.

Further, when swarf 102 is brought into contact with side surface 72 to change the outlet direction of swarf 102, swarf 102 may be brought into contact with bottom surface 71 of workpiece 70, which is a surface processed by the flat cutting edge. In this case, a scratch mark is also formed in bottom surface 71 of workpiece 70. Further, swarf 102 may be brought into contact with the side surface of cutting insert 100, with the result that a scratch mark may be formed in the side surface.

According to cutting insert 100 according to one embodiment of the present invention, first boundary J1 between first rising surface portion 32 and first rake face portion 11 extends, from one of flat cutting edge 13 and corner cutting edge 33, in the direction crossing the straight line extending along main cutting edge 23. First rising surface portion 32 functions to reduce the outlet velocity of swarf 102 around corner cutting edge 33. A distance W2 between the vicinity of the center of corner cutting edge 33 and the first rake face portion is longer than a distance W1 between the vicinity of the end portion of corner cutting edge 33 and the first rake face portion. Therefore, the curvature radius of a swarf portion cut at the vicinity of the center of corner cutting edge 33 becomes larger than the curvature radius of a swarf portion cut at the vicinity of the end portion of corner cutting edge 33. Hence, outlet velocity V1 of the swarf portion in the vicinity of the end portion of corner cutting edge 33 becomes lower than outlet velocity V2 of the swarf portion in the vicinity of the center of corner cutting edge 33. As a result, the outlet direction of swarf 102 becomes a direction D1 including a vector component of an inner circumferential direction of the milling cutter body. Therefore, swarf 102 can be suppressed from coming into contact with processed side surface 72 of workpiece 70. As a result, a scratch mark can be suppressed from remaining in the processed surface of the workpiece.

(2) In cutting insert 100 according to (1), when viewed in the direction perpendicular to reference surface 1, first boundary J1 may include a second line segment L2 continuous to first line segment L1 and extending in a direction inclined relative to first line segment L1. Accordingly, a scratch mark can be further suppressed from remaining in the processed surface of the workpiece.

(3) In cutting insert 100 according to (2), when viewed in the direction perpendicular to reference surface 1, in a direction parallel to flat cutting edge 13, an interval F1 between main cutting edge 23 and a position G1 at which first line segment L1 is continuous to one of flat cutting edge 13 and corner cutting edge 33 may be larger than an interval F2 between main cutting edge 23 and a position G2 at which first line segment L1 is continuous to second line segment L2.

(4) In cutting insert 100 according to (2) or (3), when viewed in the direction perpendicular to reference surface 1, an angle $\theta 2$ between second line segment L2 and a straight line E2 parallel to flat cutting edge 13 may be more than or equal to 80° and less than or equal to 90°.

(5) In cutting insert 100 according to any one of (2) to (4), rake face 9 may have a second rising surface portion 21a and a second rake face portion 21b, second rake face portion 21b being continuous to second rising surface portion 21a, second rake face portion 21b being located opposite to corner cutting edge 33 when viewed from second rising surface portion 21a. In a cross section parallel to main cutting edge 23 and perpendicular to reference surface 1, a second boundary J2 between second rising surface portion 21a and second rake face portion 21b may be an inflection point. When viewed in the direction perpendicular to reference surface 1, second boundary J2 may include a third line segment L3 continuous to second line segment L2 and extending in a direction inclined relative to second line segment L2.

(6) In cutting insert 100 according to (5), third line segment L3 may be continuous to main cutting edge 23.

(7) In cutting insert 100 according to any one of (1) to (6), when viewed in the direction perpendicular to reference surface 1, an angle $\theta 1$ between first line segment L1 and a straight line E1 extending along flat cutting edge 13 may be more than or equal to 20° and less than or equal to 80°.

(8) In cutting insert 100 according to (1) or (7), first boundary J1 may be continuous to main cutting edge 23.

(9) In cutting insert 100 according to (1) or (7), first boundary J1 may be continuous to corner cutting edge 33.

DETAILS OF EMBODIMENT OF THE PRESENT INVENTION

Next, the following describes details of the embodiment of the present invention with reference to figures. It should be noted that in the below-mentioned figures, the same or corresponding portions are given the same reference characters and are not described repeatedly.

First Embodiment

First, the following describes a configuration of a cutting insert 100 according to a first embodiment.

Figure 1:
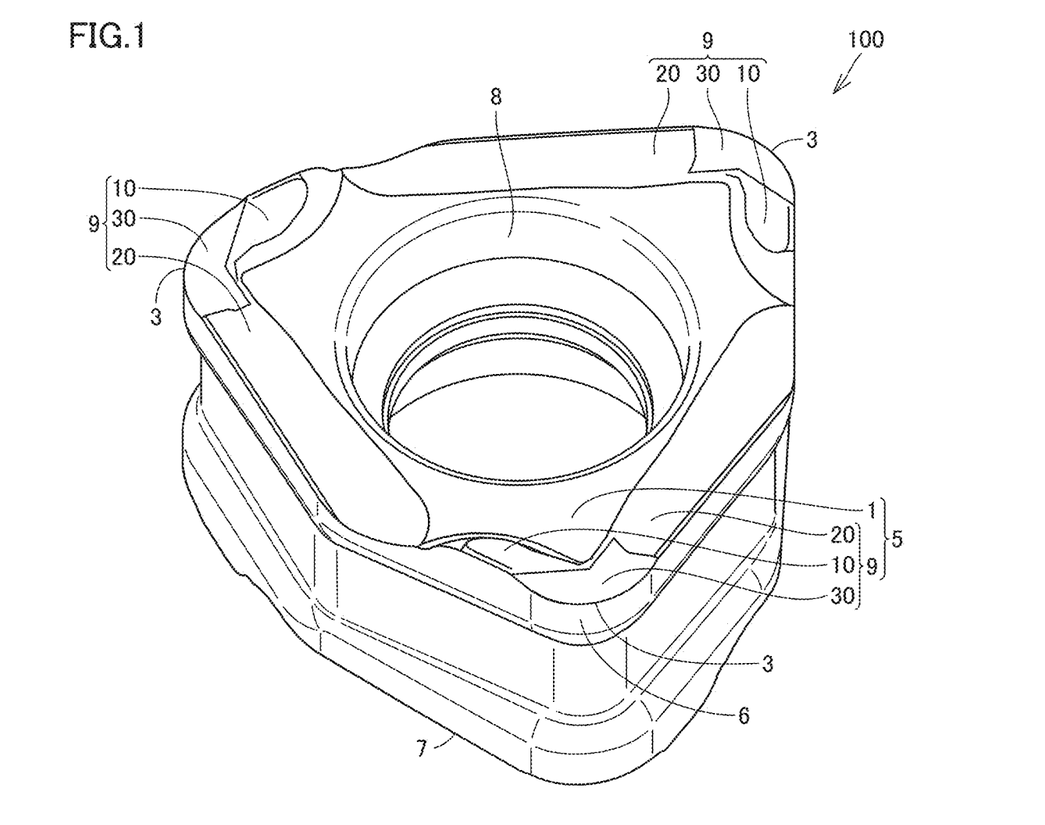
FIG. 1 is a schematic perspective view showing a configuration of a cutting insert according to a first embodiment.
Figure 2:
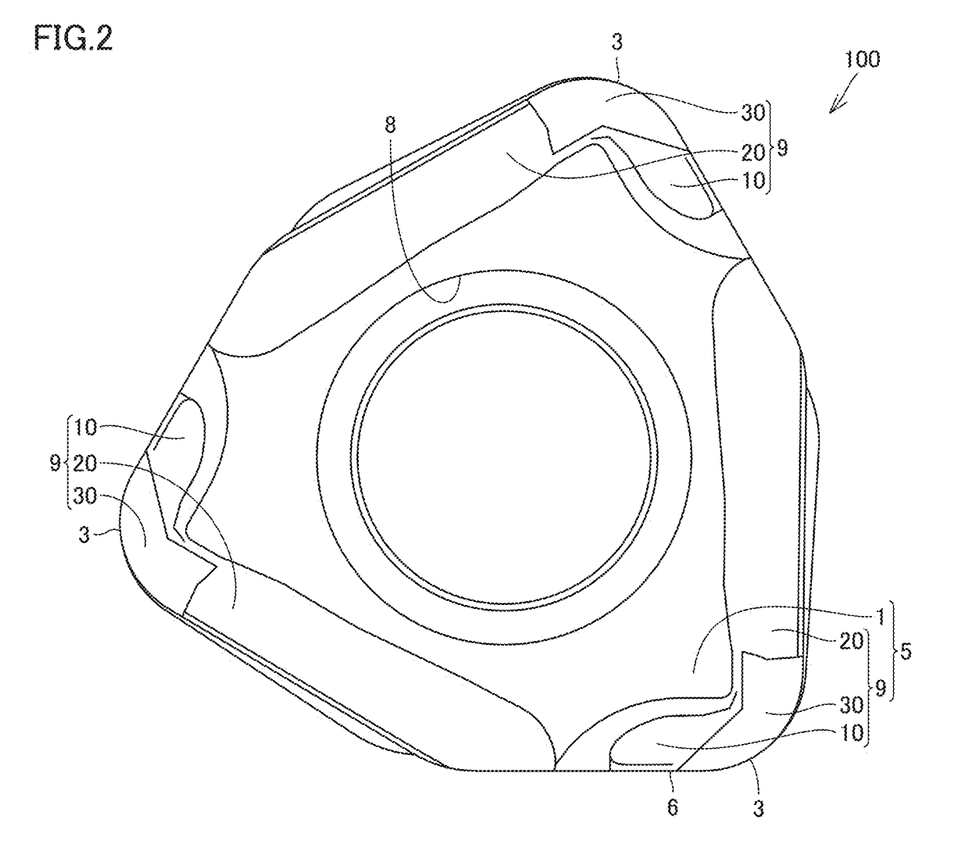
FIG. 2 is a schematic front view showing the configuration of the cutting insert according to the first embodiment.

As shown in FIG. 1 and FIG. 2, cutting insert 100 according to the first embodiment mainly includes a first surface 5, a second surface 7, and a side surface 6. Each of first surface 5 and second surface 7 has a substantially polygonal shape (substantially hexagon shape) with acute angle corners (or right-angle corners) and obtuse angle corners arranged alternately, for example. Second surface 7 is located opposite to first surface 5. Side surface 6 is continuous to both first surface 5 and second surface 7. Cutting insert 100 is provided with a through hole 8 that opens at first surface 5 and second surface 7. Side surface 6 surrounds through hole 8.

A ridgeline between first surface 5 and side surface 6 includes cutting edges 3. Cutting edges 3 are provided at three corners of first surface 5 having the substantially hexagonal shape, for example. Likewise, a ridgeline between second surface 7 and side surface 6 includes cutting edges 3. Cutting edges 3 are provided at three corners of second surface 7 having the substantially hexagonal shape, for example. First surface 5 mainly has a rake face 9 and a reference surface 1. Rake face 9 is continuous to each cutting edge 3. Reference surface 1 is located opposite to cutting edge 3 relative to rake face 9. Reference surface 1 has a flat shape. Reference surface 1 is a seating surface, for example. Reference surface 1 is located between through hole 8 and rake face 9. Cutting insert 100 is positioned in contact with a milling cutter body 101 at the seating surface, for example.

Figure 3:
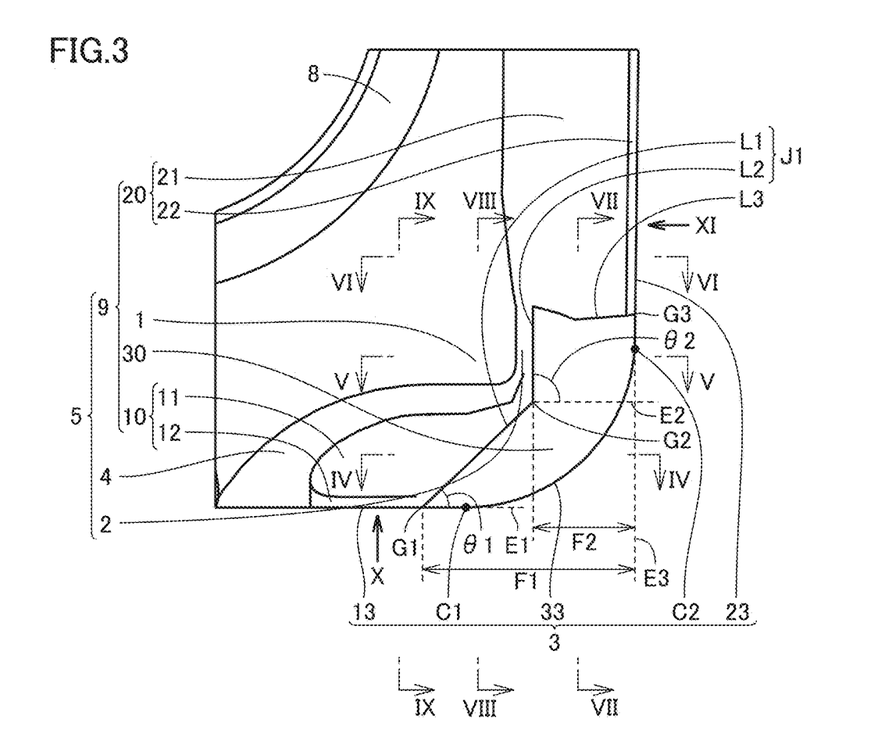
FIG. 3 is a schematic front view showing a configuration around a rake face of the cutting insert according to the first embodiment.

As shown in FIG. 3, cutting edge 3 mainly has a corner cutting edge 33, a flat cutting edge (wiper) 13, and a main cutting edge 23. Corner cutting edge 33 is located at a rounded nose portion of first surface 5. Corner cutting edge 33 has a first end portion C1 and a second end portion C2. Second end portion C2 is an end portion opposite to first end portion C1. Flat cutting edge 13 is continuous to first end portion C1 of corner cutting edge 33. Main cutting edge 23 is continuous to second end portion C2 of corner cutting edge 33.

Rake face 9 has a first region 10, a second region 20, and a third region 30. First region 10 is continuous to flat cutting edge 13. Second region 20 is continuous to main cutting edge 23. Third region 30 is continuous to corner cutting edge 33. Third region 30 is located between first region 10 and second region 20. First region 10 may have a first inclined surface 11 and a second inclined surface 12. Second inclined surface 12 is continuous to flat cutting edge 13. First inclined surface 11 is continuous to second inclined surface 12. First inclined surface 11 is located opposite to flat cutting edge 13 relative to second inclined surface 12. Second region 20 may have a third inclined surface 21 and a fourth inclined surface 22. Fourth inclined surface 22 is continuous to main cutting edge 23. Third inclined surface 21 is continuous to fourth inclined surface 22. Third inclined surface 21 is located opposite to main cutting edge 23 relative to fourth inclined surface 22. Third region 30 is continuous to corner cutting edge 33.

Figure 4:
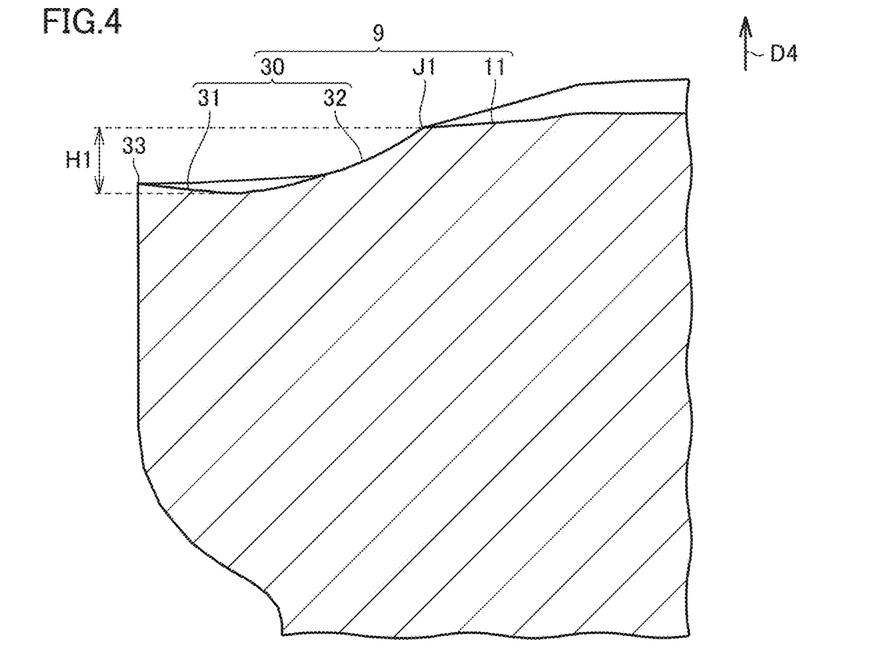
FIG. 4 is a schematic cross sectional view taken along a IV-IV line of FIG. 3.

FIG. 4 is a schematic cross sectional view taken along a Iv-Iv line of FIG. 3. As shown in FIG. 4, rake face 9 has a fifth inclined surface 31, a first rising surface portion 32, and a first rake face portion 11. Fifth inclined surface 31 is continuous to corner cutting edge 33. Fifth inclined surface 31 is continuous to first rising surface portion 32. First rising surface portion 32 is located opposite to corner cutting edge 33 when viewed from fifth inclined surface 31. First rake face portion 11 is continuous to first rising surface portion 32. First rake face portion 11 is located opposite to corner cutting edge 33 when viewed from first rising surface portion 32.

As shown in FIG. 4, in a cross section parallel to flat cutting edge 13 and perpendicular to reference surface 1, a first boundary J1 between first rising surface portion 32 and first rake face portion 11 is an inflection point. When viewed in the cross section, the inclination of the tangent of first rising surface portion 32 is different from the inclination of the tangent of first rake face portion 11. When viewed in the cross section, first rising surface portion 32 may form an inwardly protruding curve or may form a straight line. When viewed in the cross section, first rake face portion 11 may form an outwardly protruding curve or may form a straight line. When viewed in a cross section, the inclination angle of first rising surface portion 32 may become smaller as first rising surface portion 32 becomes further away from flat cutting edge 13. In a direction D4 perpendicular to reference surface 1, the height of first boundary J1 may be higher than corner cutting edge 33. In direction D4 perpendicular to reference surface 1, a distance H1 between first boundary J1 and a boundary between fifth inclined surface 31 and first rising surface portion 32 is more than or equal to 0.04 mm and less than or equal to 0.50 mm, for example.

As shown in FIG. 4, fifth inclined surface 31 is inclined at a positive angle relative to reference surface 1. The expression "fifth inclined surface 31 is inclined at a positive angle relative to reference surface 1" means that fifth inclined surface 31 is inclined relative to reference surface 1 such that fifth inclined surface 31 becomes lower as fifth inclined surface 31 becomes further away from corner cutting edge 33. From another viewpoint, the expression "fifth inclined surface 31 is inclined at a positive angle relative to reference surface 1" indicates a case where fifth inclined surface 31 extends in the lower right direction when cutting insert 100 is disposed such that corner cutting edge 33 is directed to the left and reference surface 1 is directed upward (see FIG. 4). On the other hand, first rising surface portion 32 is inclined relative to reference surface 1 to be higher as first rising surface portion 32 becomes further away from corner cutting edge 33. That is, first rising surface portion 32 is inclined at a negative angle relative to reference surface 1. First rake face portion 11 may be inclined at a positive angle relative to reference surface 1, may be inclined at a negative angle relative to reference surface 1, or may be parallel to reference surface 1.

As shown in FIG. 3, when viewed in the direction perpendicular to reference surface 1, first boundary J1 between first rising surface portion 32 and first rake face portion 11 includes a first line segment L1 extending, from one of flat cutting edge 13 and corner cutting edge 33, in a direction crossing a straight line E3 extending along main cutting edge 23. One of flat cutting edge 13 and corner cutting edge 33 may be flat cutting edge 13 and corner cutting edge 33. First line segment L1 may extend from one of flat cutting edge 13 and corner cutting edge 33 in a direction crossing main cutting edge 23 or in a direction crossing corner cutting edge 33.

As shown in FIG. 3, when viewed in the direction perpendicular to reference surface 1, an angle θ1 between first line segment L1 and a straight line E1 extending along flat cutting edge 13 may be more than or equal to 20° and less than or equal to 80°. The upper limit of angle θ1 may be 70° or may be 60°. The lower limit of angle θ1 may be 30° or may be 45°.

Figure 5:
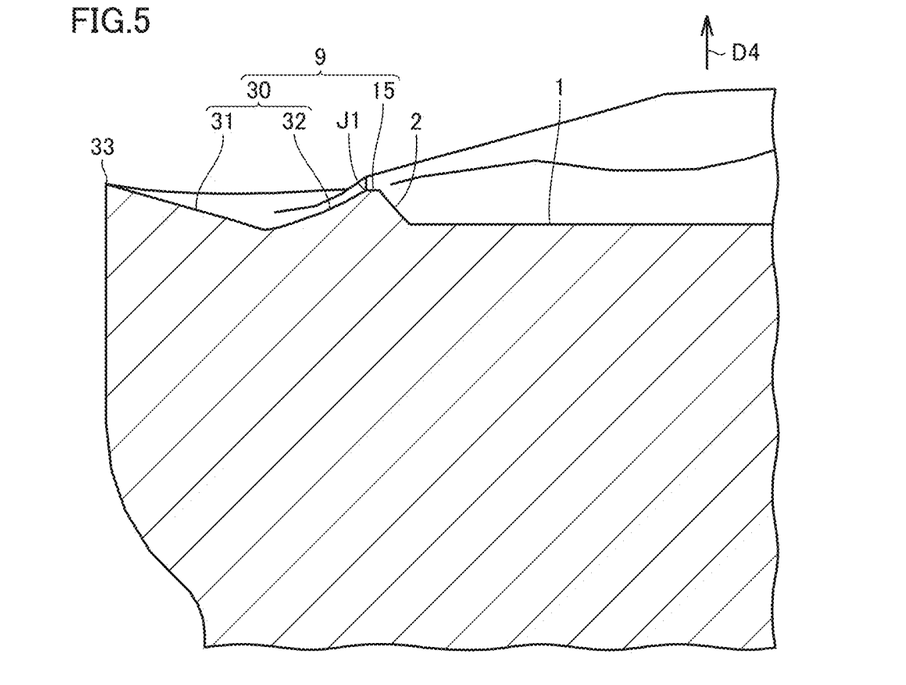
FIG. 5 is a schematic cross sectional view taken along a V-V line of FIG. 3.

FIG. 5 is a schematic cross sectional view taken along a V-V line of FIG. 3. As shown in FIG. 5, rake face 9 has fifth inclined surface 31, first rising surface portion 32, and a third rake face portion 15. Fifth inclined surface 31 is continuous to corner cutting edge 33. Fifth inclined surface 31 is continuous to first rising surface portion 32. First rising surface portion 32 is located opposite to corner cutting edge 33 when viewed from fifth inclined surface 31. Third rake face portion 15 is continuous to first rising surface portion 32. Third rake face portion 15 is located opposite to corner cutting edge 33 when viewed from first rising surface portion 32. Sixth inclined surface 2 is continuous to third rake face portion 15. Sixth inclined surface 2 is located opposite to corner cutting edge 33 when viewed from third rake face portion 15. Reference surface 1 is continuous to sixth inclined surface 2. Reference surface 1 is located opposite to corner cutting edge 33 when viewed from sixth inclined surface 2.

As shown in FIG. 5, in the cross section parallel to flat cutting edge 13 and perpendicular to reference surface 1, first boundary J1 between first rising surface portion 32 and third rake face portion 15 is an inflection point. Fifth inclined surface 31 is inclined at a positive angle relative to reference surface 1. First rising surface portion 32 is inclined at a negative angle relative to reference surface 1. Third rake face portion 15 may be inclined at a positive angle relative to reference surface 1, may be inclined at a negative angle relative to reference surface 1, or may be parallel to reference surface 1. Sixth inclined surface 2 is inclined at a positive angle. As shown in FIG. 5, in direction D4 perpendicular to reference surface 1, the height of first boundary J1 may be lower than corner cutting edge 33. The height of first boundary J1 may be higher than reference surface 1.

As shown in FIG. 3, when viewed in the direction perpendicular to reference surface 1, first boundary J1 may include a second line segment L2. Second line segment L2 is continuous to first line segment L1 and extends in a direction inclined relative to first line segment L1. As shown in FIG. 3, when viewed in the direction perpendicular to reference surface 1, an angle θ2 between second line segment L2 and straight line E2 parallel to flat cutting edge 13 is more than or equal to 80° and not less than or equal to 90°, for example. The lower limit of angle θ2 may be 85° or may be 90°.

As shown in FIG. 3, when viewed in the direction perpendicular to reference surface 1, in the direction parallel to flat cutting edge 13, an interval F1 between main cutting edge 23 and a position G1 at which first line segment L1 is continuous to one of flat cutting edge 13 and corner cutting edge 33 may be larger than an interval F2 between main cutting edge 23 and a position G2 at which first line segment L1 is continuous to second line segment L2. Interval F1 is 1.6 mm, for example. Interval F2 is 0.8 mm, for example. Interval F1 is more than or equal to 0.5 mm and less than or equal to 3.5 mm, for example. Interval F2 is more than or equal to 0.4 mm and less than or equal to 3.0 mm, for example. When viewed in the direction perpendicular to reference surface 1, the curvature radius of corner cutting edge 33 is more than or equal to 0.4 mm and less than or equal to 3.5 mm, for example.

Figure 6:
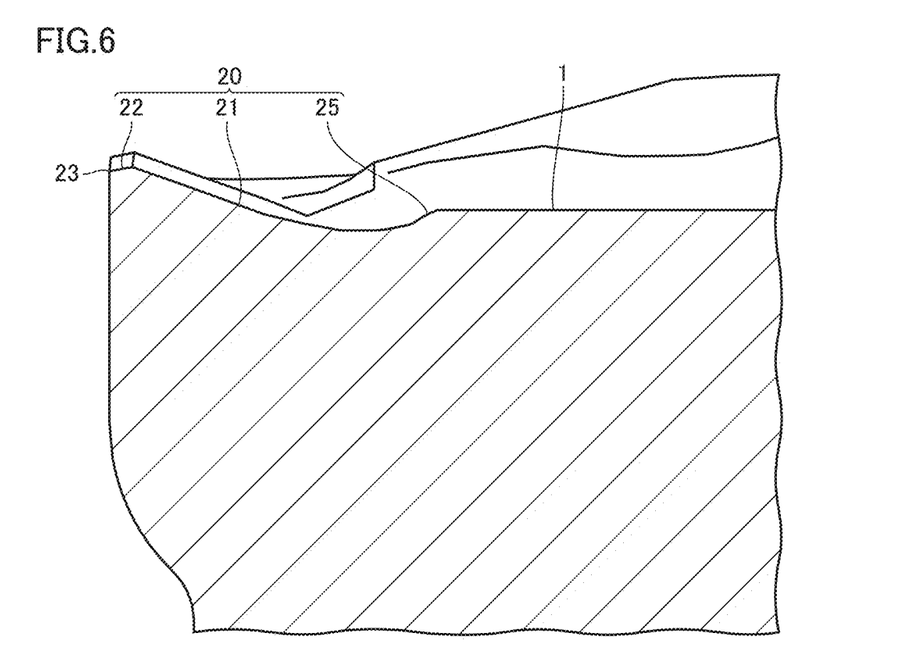
FIG. 6 is a schematic cross sectional view taken along a VI-VI line of FIG. 3.

FIG. 6 is a schematic cross sectional view taken along a VI-VI line of FIG. 3. As shown in FIG. 6, second region 20 has third inclined surface 21, fourth inclined surface 22, and a seventh inclined surface 25. Third inclined surface 21 is continuous to main cutting edge 23. Third inclined surface 21 is inclined at a negative angle, for example. Third inclined surface 21 is continuous to fourth inclined surface 22. When viewed from third inclined surface 21, fourth inclined surface 22 is located opposite to corner cutting edge 33. Fourth inclined surface 22 is inclined at a positive angle, for example. Seventh inclined surface 25 is continuous to fourth inclined surface 22. When viewed from fourth inclined surface 22, seventh inclined surface 25 is located opposite to corner cutting edge 33. Seventh inclined surface 25 is inclined at a negative angle, for example. Seventh inclined surface 25 is continuous to reference surface 1.

Figure 7:
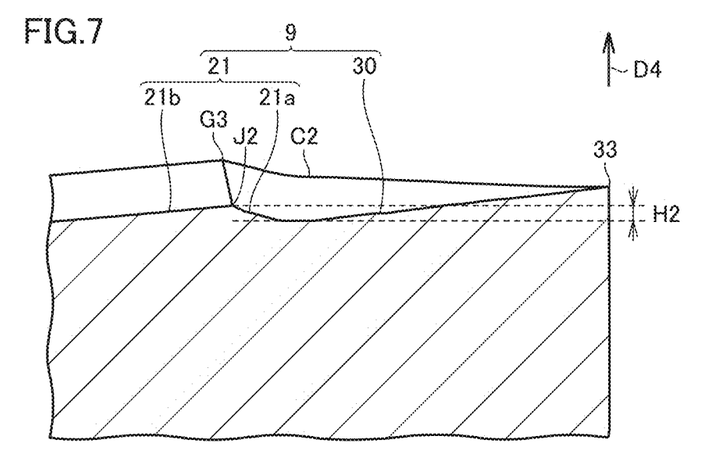
FIG. 7 is a schematic cross sectional view taken along a VII-VII line of FIG. 3.

FIG. 7 is a schematic cross sectional view taken along a VII-VII line of FIG. 3. As shown in FIG. 7, rake face 9 has third region 30, a second rising surface portion 21a, and a second rake face portion 21b. Third region 30 is continuous to corner cutting edge 33. Third region 30 is continuous to second rising surface portion 21a. When viewed from third region 30, second rising surface portion 21a is located opposite to corner cutting edge 33. Second rake face portion 21b is continuous to second rising surface portion 21a. When viewed from second rising surface portion 21a, second rake face portion 21b is located opposite to corner cutting edge 33.

As shown in FIG. 7, in the cross section parallel to main cutting edge 23 and perpendicular to reference surface 1, a second boundary J2 between second rising surface portion 21a and second rake face portion 21b may be an inflection point. For example, when viewed in the cross section, the inclination of the tangent of second rising surface portion 21a is different from the inclination of the tangent of second rake face portion 21b. When viewed in the cross section, second rising surface portion 21a may form an inwardly protruding curve or may form a straight line. When viewed in the cross section, second rake face portion 21b may form an outwardly protruding curve or may form a straight line. In direction D4 perpendicular to reference surface 1, a distance H2 between second boundary J2 and a boundary between third region 30 and second rising surface portion 21a is more than or equal to 0.04 mm and less than or equal to 0.50 mm, for example.

As shown in FIG. 7, third region 30 is inclined at a positive angle relative to reference surface 1. Here, the expression "third region 60 is inclined at a positive angle relative to reference surface 1" means that third region 30 is inclined relative to reference surface 1 such that third region 30 becomes lower as third region 30 becomes further away from corner cutting edge 33. From another viewpoint, the expression "third region 30 is inclined at a positive angle relative to reference surface 1" indicates a case where third region 30 extends in the lower left direction when cutting insert 100 is disposed such that corner cutting edge 33 is directed to the right and reference surface 1 is directed upward (see FIG. 7). On the other hand, second rising surface portion 21a is inclined relative to reference surface 1 to be higher as second rising surface portion 21a becomes further away from corner cutting edge 33. That is, second rising surface portion 21a is inclined at a negative angle relative to reference surface 1. Second rake face portion 21b may be inclined at a positive angle relative to reference surface 1, may be inclined at a negative angle relative to reference surface 1, or may be parallel to reference surface 1. Second rising surface portion 21a is a portion of second region 20, for example. Second rising surface portion 21a may be a portion of third region 30, or may be a region including a boundary between second region 20 and third region 30.

Second boundary J2 between second rising surface portion 21a and second rake face portion 21b includes a third line segment L3, for example. As shown in FIG. 3, when viewed in the direction perpendicular to reference surface 1, third line segment L3 is continuous to second line segment L2 and extends in the direction inclined relative to second line segment L2. Third line segment L3 is continuous to main cutting edge 23, for example. Third line segment L3 may be bent at its portion or may be in the form of a straight line. Third line segment L3 extends in a direction substantially parallel to flat cutting edge 13, for example.

Figure 8:
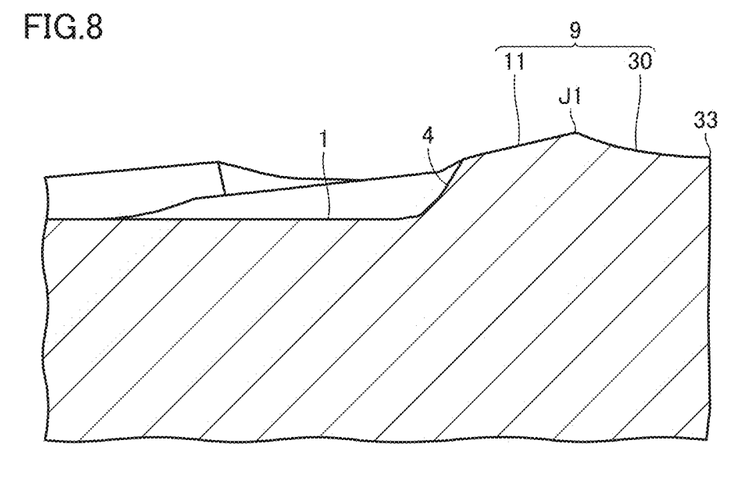
FIG. 8 is a schematic cross sectional view taken along a VIII-VIII line of FIG. 3.

FIG. 8 is a schematic cross sectional view taken along a VIII-VIII line of FIG. 3. As shown in FIG. 8, in a cross section parallel to main cutting edge 23, crossing first line segment L1 and perpendicular to reference surface 1, third region 30 is inclined at a negative angle relative to reference surface 1, for example. First inclined surface 11 is inclined at a positive angle relative to reference surface 1, for example. In the cross section shown in FIG. 8, first boundary J1 may be an apex of rake face 9. Eighth inclined surface 4 is inclined at a positive angle relative to reference surface 1, for example. The inclination angle of eighth inclined surface 4 may be larger than the inclination angle of first inclined surface 11. Eighth inclined surface 4 is continuous to reference surface 1.

Figure 9:
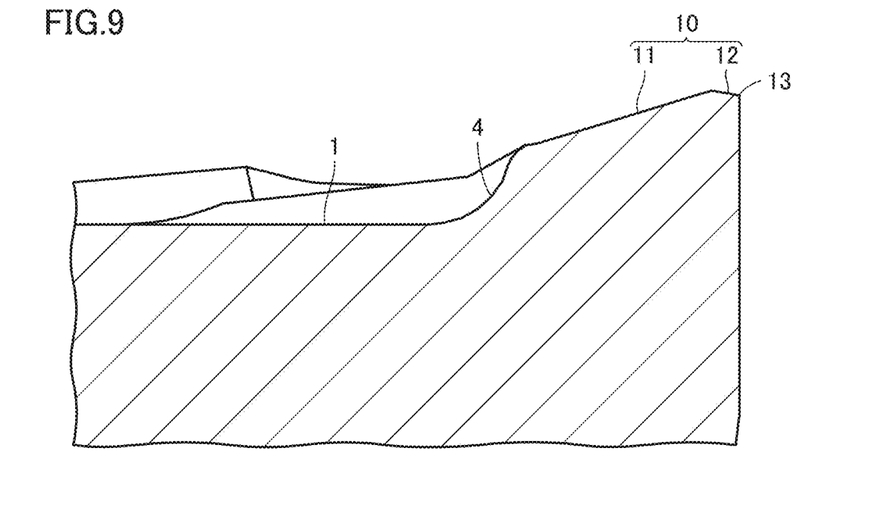
FIG. 9 is a schematic cross sectional view taken along a IX-IX line of FIG. 3.

FIG. 9 is a schematic cross sectional view taken along a IX-IX line of FIG. 3. As shown in FIG. 9, in a cross section parallel to main cutting edge 23, spaced away from first line segment L1, crossing flat cutting edge 13 and perpendicular to reference surface 1, second inclined surface 12 is inclined at a negative angle relative to reference surface 1, for example. First inclined surface 11 is inclined at a positive angle relative to reference surface 1, for example.

Figure 10:
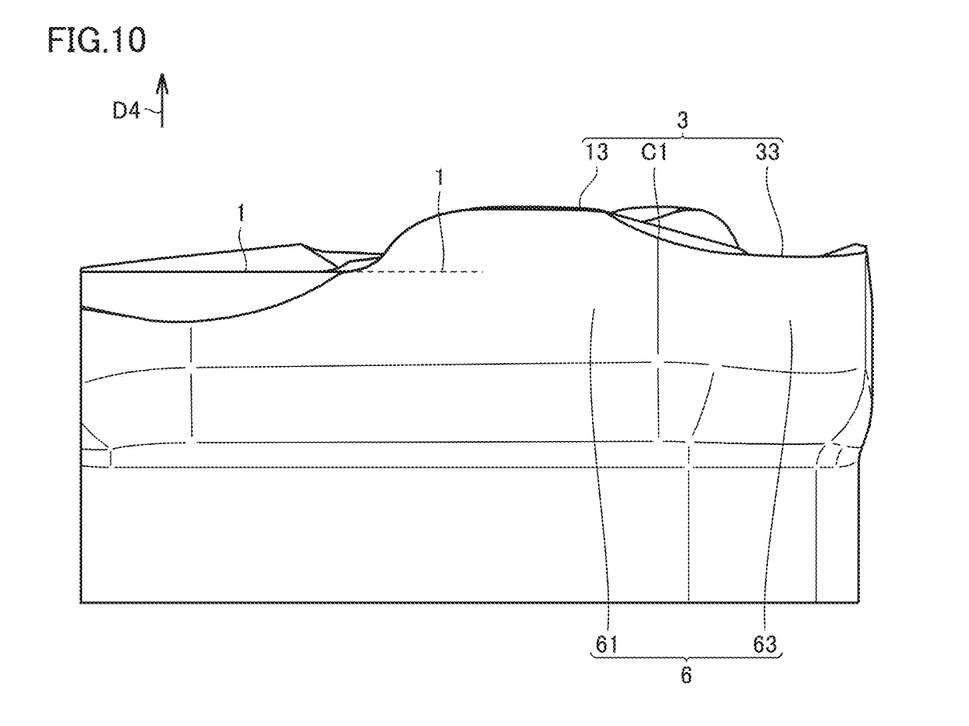
FIG. 10 is a schematic side view showing the configuration of the cutting insert when viewed in a direction of arrow X of FIG. 3.
Figure 11:
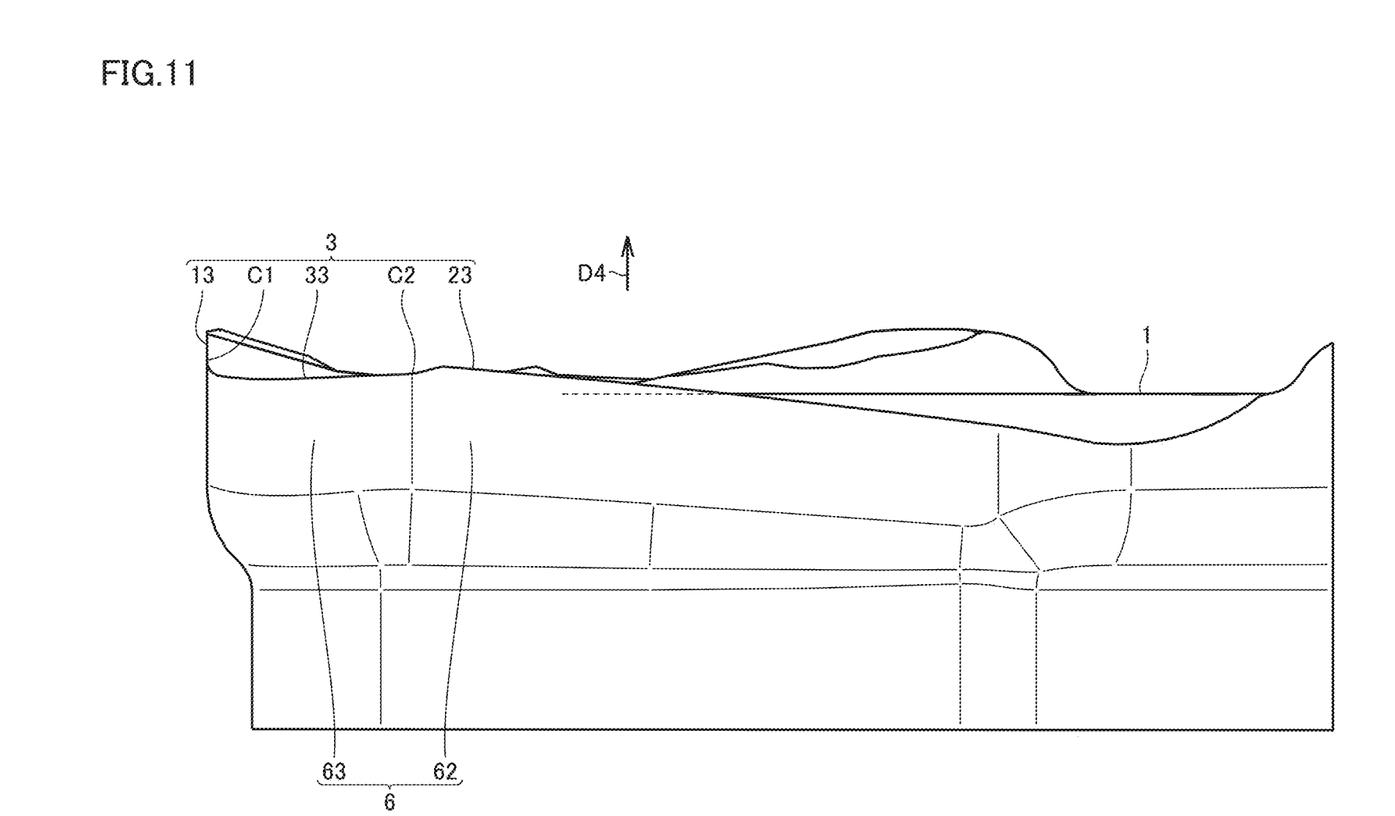
FIG. 11 is a schematic side view showing the configuration of the cutting insert when viewed in a direction of arrow XI of FIG. 3.

As shown in FIG. 10 and FIG. 11, side surface 6 has a first side portion 61, a second side portion 62, and a third side portion 63. A ridgeline between first side portion 61 and first region 10 constitutes flat cutting edge 13. A ridgeline between second side portion 62 and second region 20 constitutes main cutting edge 23. A ridgeline between third side portion 63 and third region 30 constitutes corner cutting edge 33. When viewed in the direction perpendicular to reference surface 1, corner cutting edge 33 has an arc shape. When viewed in the direction perpendicular to reference surface 1, each of flat cutting edge 13 and main cutting edge 23 has a straight line shape.

As shown in FIG. 10 and FIG. 11, in direction D4 perpendicular to reference surface 1, first end portion C1 and second end portion C2 of corner cutting edge 33 are higher than reference surface 1. The expression "first end portion C1 and second end portion C2 are higher than reference surface 1" means that first end portion C1 and second end portion C2 are located above reference surface 1 when cutting insert 100 is disposed with reference surface 1 being directed upward. As shown in FIG. 10, flat cutting edge 13 has a portion that becomes higher as flat cutting edge 13 becomes further away from first end portion C1. As shown in FIG. 11, main cutting edge 23 has a portion that becomes higher as main cutting edge 23 becomes further away from second end portion C2, and has a portion that becomes lower as main cutting edge 23 becomes further away from second end portion C2. When viewed in the direction parallel to reference surface 1, main cutting edge 23 extends to cross reference surface 1. In other words, in direction D4 perpendicular to reference surface 1, as main cutting edge 23 becomes further away from second end portion C2, main cutting edge 23 becomes closer to reference surface 1, and after crossing reference surface 1, main cutting edge 23 is separated from reference surface 1.

Next, the following describes function and effect of cutting insert 100 according to the first embodiment.

According to cutting insert 100 according to the first embodiment, first boundary J1 between first rising surface portion 32 and first rake face portion 11 extends, from one of flat cutting edge 13 and corner cutting edge 33, in the direction crossing the straight line extending along main cutting edge 23. First rising surface portion 32 functions to reduce the outlet velocity of swarf 102 around corner cutting edge 33. A distance W2 between the vicinity of the center of corner cutting edge 33 and the first rake face portion is longer than a distance W1 between the vicinity of the end portion of corner cutting edge 33 and the first rake face portion (see FIG. 12). Therefore, the curvature radius of a swarf portion cut at the vicinity of the center of corner cutting edge 33 becomes larger than the curvature radius of a swarf portion cut at the vicinity of the end portion of corner cutting edge 33. Hence, outlet velocity V1 of the swarf portion in the vicinity of the end portion of corner cutting edge 33 becomes lower than outlet velocity V2 of the swarf portion in the vicinity of the center of corner cutting edge 33. As a result, the outlet direction of swarf 102 becomes a direction D1 including a vector component of the inner circumferential direction of the milling cutter body. Therefore, swarf 102 can be suppressed from coming into contact with processed side surface 72 of workpiece 70. As a result, a scratch mark can be suppressed from remaining in the processed surface of the workpiece.

Moreover, according to cutting insert 100 according to the first embodiment, swarf 102 can be suppressed from coming into contact with unprocessed upper surface 73 of workpiece 70. As a result, a scratch mark can be suppressed from remaining in upper surface 73. Since swarf 102 can be suppressed from coming into contact with side surface 72, swarf 102 is discharged in an excellent manner. As a result, swarf 102 can be suppressed from coming into contact with bottom surface 71 of workpiece 70, which is a surface processed by the flat cutting edge. As a result, a scratch mark can be suppressed from being formed in bottom surface 71 of workpiece 70. Furthermore, swarf 102 can be suppressed from coming into contact with side surface 6 of cutting insert 100. As a result, a scratch mark can be suppressed from being formed in side surface 6 of cutting insert 100.

Further, according to cutting insert 100 according to the first embodiment, when viewed in the direction perpendicular to reference surface 1, first boundary J1 includes second line segment L2 continuous to first line segment L1 and extending in the direction inclined relative to first line segment L1. Accordingly, a scratch mark can be further suppressed from remaining in the processed surface of the workpiece.

Second Embodiment

Next, the following describes a configuration of a cutting insert 100 according to a second embodiment. The cutting insert according to the second embodiment is different from the cutting insert according to the first embodiment in terms of its configuration in which the first boundary is continuous to the main cutting edge. The other configurations of the cutting insert according to the second embodiment are substantially the same as those of the cutting insert according to the first embodiment. In the description below, the configuration different from that of the cutting insert according to the first embodiment will be mainly described.

Figure 14:
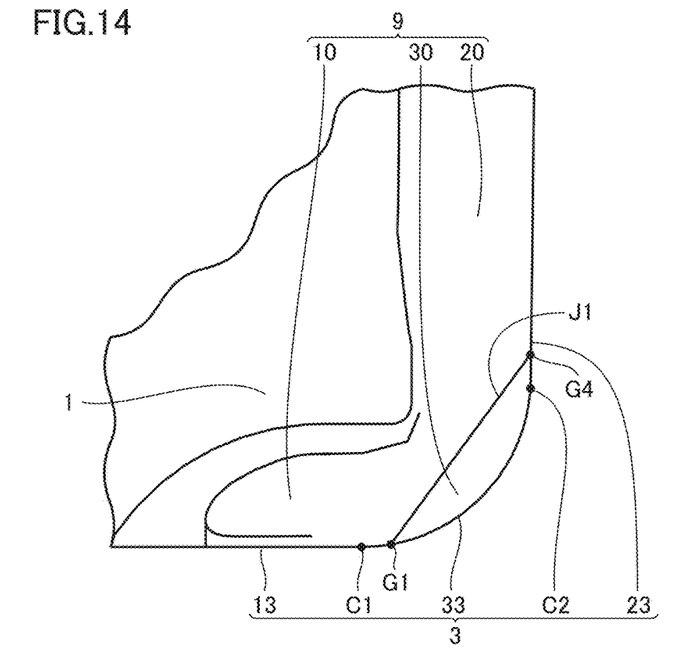
FIG. 14 is a schematic front view showing a configuration of a cutting insert according to a second embodiment.

As shown in FIG. 14, when viewed in the direction perpendicular to reference surface 1, first boundary J1 between first rising surface portion 32 and first rake face portion 11 may be continuous to main cutting edge 23. First boundary J1 may extend continuously from corner cutting edge 33 to main cutting edge 23. Position G1 at which first boundary J1 is continuous to one of flat cutting edge 13 and corner cutting edge 33 may be flat cutting edge 13, may be corner cutting edge 33, or may be first end portion C1.

Third Embodiment

Next, the following describes a configuration of a cutting insert 100 according to a third embodiment. The cutting insert according to the third embodiment is different from the cutting insert according to the first embodiment in terms of its configuration in which the first boundary is continuous to the corner cutting edge. The other configurations of the cutting insert according to the third embodiment are substantially the same as those of the cutting insert according to the first embodiment. In the description below, the configuration different from that of the cutting insert according to the first embodiment will be mainly described.

Figure 15:
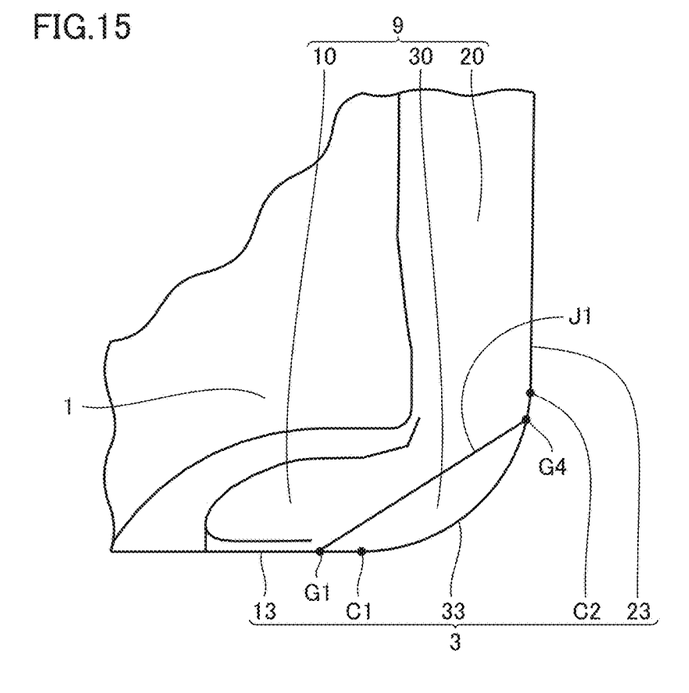
FIG. 15 is a schematic front view showing a configuration of a cutting insert according to a third embodiment.

As shown in FIG. 15, when viewed in the direction perpendicular to reference surface 1, first boundary J1 between first rising surface portion 32 and first rake face portion 11 may be continuous to corner cutting edge 33. First boundary J1 may extend continuously from flat cutting edge 13 to corner cutting edge 33. Position G1 at which first boundary J1 is continuous to one of flat cutting edge 13 and corner cutting edge 33 may be flat cutting edge 13, may be corner cutting edge 33, or may be first end portion C1.

EXAMPLES (Preparation of Samples)

First, cutting inserts according to a sample 1 and a sample 2 were prepared. The cutting inserts according to sample 1 and sample 2 are an example and a comparative example, respectively. The radius (nose radius) of the corner cutting edge of each of the cutting inserts according to sample 1 and sample 2 was 1.6 mm. As sample 1, the cutting insert according to the first embodiment was used. Specifically, in the cutting insert according to the first embodiment, a first rising portion (level difference) was provided at a portion of the rake face (see FIG. 4). On the other hand, in the cutting insert according to sample 2, no first rising portion (level difference) was provided.

(Evaluation Method)

Each of the cutting inserts was attached to a cutter body. The diameter of the cutter body was 100 mm. The cutting insert had a single cutting edge. A cutting speed ($V_c$) was set at 200 m/min. A feed rate ($f_z$) was set at 0.2 mm/t. The workpiece (material to be processed) was S50C. A dry process was performed. An amount of cut in the depth direction was set at 3 mm and cut-in was performed 6 times in the depth direction. First, milling was performed to a workpiece with an amount (ap) of cut in the depth direction being set at 3 mm and an amount of cut (ae) in the axial direction being set at 10 mm. After the milling, it was visually checked whether or not a scratch mark was formed in the processed surface of the workpiece.

When no scratch mark was formed, the amount of cut in the depth direction was increased and milling was subsequently performed to the workpiece. Specifically, milling was performed to the workpiece with the amount of cut in the depth direction being set at 6 mm and the amount of cut in the axial direction being set at 10 mm. The milling and the checking as to presence/absence of scratch mark were repeated until the amount of cut in the depth direction becomes 18 mm with the amount of cut in the depth direction being increased by 3 mm for each time while maintaining the amount of cut in the axial direction at 10 mm.

Next, the amount of cut in the axial direction was increased to 20 mm. The milling and the checking as to presence/absence of scratch mark were repeated until the amount of cut in the depth direction becomes 18 mm with the amount of cut in the depth direction being increased by 3 mm for each time while maintaining the amount of cut in the axial direction at 20 mm. When it was confirmed that a scratch mark was formed in the processed surface of the workpiece, the milling with the amount of cut in the axial direction was ended. It was determined that a scratch mark was formed in the processed surface, when the processed surface lost metallic luster and looked white. The same step was repeated until the amount of cut in the axial direction became 100 mm.

(Evaluation Result)

Figure 16:
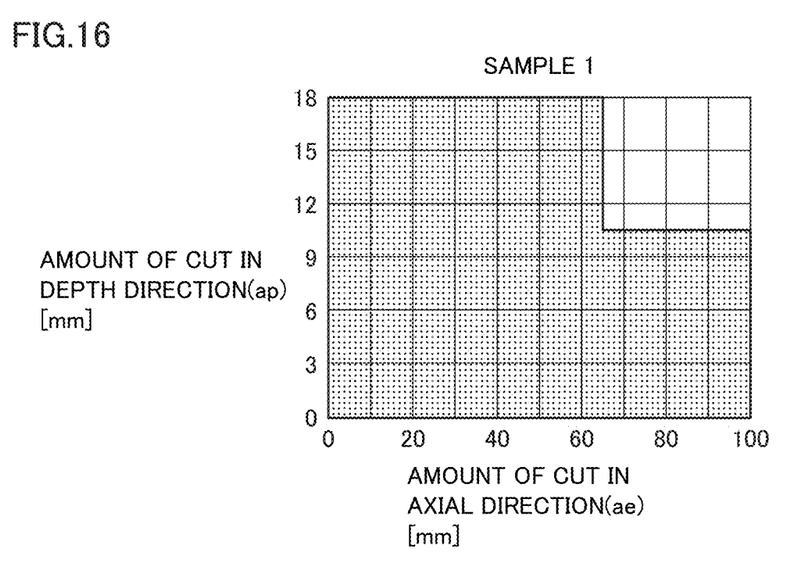
FIG. 16 shows a relation between an amount of cut (ap) in a depth direction and an amount of cut (ae) in an axial direction when processed using a cutting insert according to a sample 1.
Figure 17:
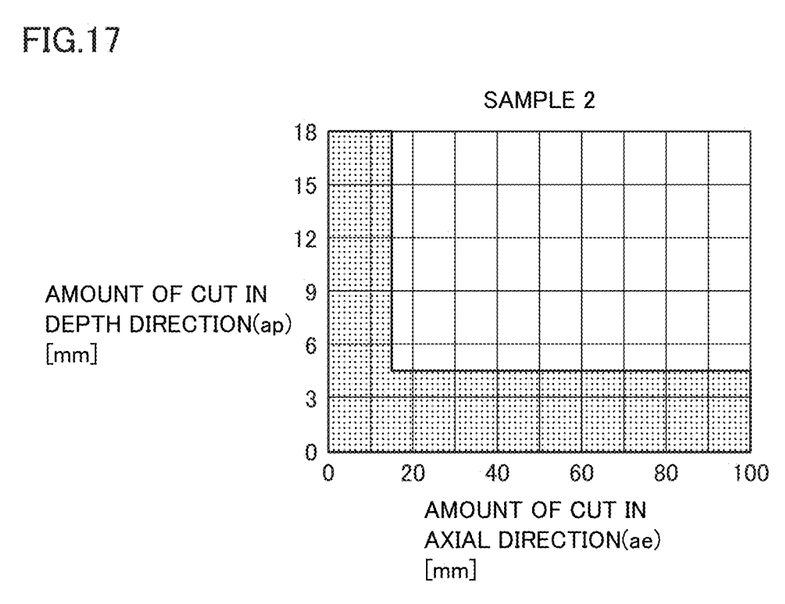
FIG. 17 shows a relation between an amount of cut (ap) in a depth direction and an amount of cut (ae) in an axial direction when processed using a cutting insert according to a sample 2.

FIG. 16 and FIG. 17 respectively show a relation between the amount of cut (ap) in the depth direction and the amount of cut (ae) in the axial direction when processed using the cutting inserts according to sample 1 and sample 2.

As shown in FIG. 16, when the cutting insert according to sample 1 was used, ap=18 mm could be attained under conditions that ae was less than or equal to 60 mm. Moreover, ap=9 mm could be attained under conditions that ae was more than or equal to 70 mm and less than or equal to 100 mm. In other words, a scratch mark was generated when ap=12 mm under conditions that ae was less than or equal to 70 mm and more than or equal to 100 mm.

As shown in FIG. 17, when the cutting insert according to sample 2 was used, ap=18 mm could be attained under conditions that ae=10 mm. Moreover, ap=3 mm could be attained under conditions that ae was more than or equal to 20 mm and less than or equal to 100 mm. In other words, a scratch mark was generated when ap=6 mm under conditions that ae was more than or equal to 20 mm and less than or equal to 100 mm.

In view of the above result, it was confirmed that a scratch mark can be suppressed from remaining in the processed surface of the workpiece by providing the level difference extending, from one of flat cutting edge 13 and corner cutting edge 33, in the direction crossing the straight line extending along main cutting edge 23.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: reference surface; 2: sixth inclined surface; 3: cutting edge; 4: eighth inclined surface; 5: first surface; 6: side surface; 7: second surface; 8: through hole; 9: rake face; 10: first region; 11: first rake face portion (first inclined surface); 12: second inclined surface; 13: flat cutting edge; 15: third rake face portion; 20: second region; 21: third inclined surface; 21a: second rising surface portion; 21b: second rake face portion; 22: fourth inclined surface; 23: main cutting edge; 25: seventh inclined surface; 30: third region; 31: fifth inclined surface; 32: first rising surface portion; 33: corner cutting edge; 61: first side portion; 62: second side portion; 63: third side portion; 70: workpiece; 71: bottom surface; 72: side surface; 73: upper surface; 100: cutting insert; 101: milling cutter body; 102: swarf; A: rotation direction; B: movement direction; C1: first end portion; C2: second end portion; D1, D2, D3, D4: direction; E1, E2, E3: straight line; F1, F2: interval; G1, G2: position; H1, H2, W1, W2: distance; J1: first boundary; J2: second boundary; L1: first line segment; L2: second line segment; L3: third line segment; V1, V2: outlet velocity.

The invention claimed is:

1. A cutting insert comprising:
   a first surface;
   a second surface located opposite to the first surface; and
   a side surface continuous to both of the first surface and the second surface,
   a ridgeline between the first surface and the side surface including a cutting edge,
   the first surface including a rake face and a reference surface, the rake face being continuous to the cutting edge, the reference surface being located opposite to the cutting edge relative to the rake face, the reference surface having a flat shape,
   the cutting edge having a corner cutting edge, a flat cutting edge, and a main cutting edge, the flat cutting edge being continuous to a first end portion of the corner cutting edge, the main cutting edge being continuous to a second end portion of the corner cutting edge opposite to the first end portion of the corner cutting edge,
   the rake face having a first rising surface portion and a first rake face portion, the first rake face portion being continuous to the first rising surface portion, the first rake face portion being located opposite to the corner cutting edge when viewed from the first rising surface portion,
   in a cross section parallel to the flat cutting edge and perpendicular to the reference surface, a first boundary between the first rising surface portion and the first rake face portion being an inflection point,
   when viewed in a direction facing the reference surface, the first boundary including a first line segment extending, from one of the flat cutting edge and the corner cutting edge, in a direction crossing a straight line extending along the main cutting edge, and
   when the rake face is directed upward, the flat cutting edge is located on an upper side relative to the corner cutting edge in a direction perpendicular to the reference surface.

2. The cutting insert according to claim 1, wherein when viewed in the direction facing the reference surface, the first boundary includes a second line segment continuous to the first line segment and extending in a direction inclined relative to the first line segment.

3. The cutting insert according to claim 2, wherein when viewed in the direction facing the reference surface, in a direction parallel to the flat cutting edge, an interval between the main cutting edge and a position at which the first line segment is continuous to one of the flat cutting edge and the corner cutting edge is larger than an interval between the main cutting edge and a position at which the first line segment is continuous to the second line segment.

4. The cutting insert according to claim 2, wherein when viewed in the direction facing the reference surface, an angle between the second line segment and a straight line parallel to the flat cutting edge is more than or equal to 80° and less than or equal to 90°.

5. The cutting insert according to claim 2, wherein
   the rake face has a second rising surface portion and a second rake face portion, the second rake face portion being continuous to the second rising surface portion, the second rake face portion being located opposite to the corner cutting edge when viewed from the second rising surface portion,
   in a cross section parallel to the main cutting edge and perpendicular to the reference surface, a second boundary between the second rising surface portion and the second rake face portion is an inflection point,
   when viewed in the direction facing the reference surface, the second boundary includes a third line segment continuous to the second line segment and extending in a direction inclined relative to the second line segment.

6. The cutting insert according to claim 5, wherein the third line segment is continuous to the main cutting edge.

7. The cutting insert according to claim 1, wherein when viewed in the direction facing the reference surface, an angle between the first line segment and a straight line extending along the flat cutting edge is more than or equal to 20° and less than or equal to 80°.

8. The cutting insert according to claim 1, wherein the first boundary is continuous to the main cutting edge.

9. The cutting insert according to claim 1, wherein the first boundary is continuous to the corner cutting edge.

* * * * *